| United States Patent [19] | [11] Patent Number: 4,460,414 |
| Hwang | [45] Date of Patent: Jul. 17, 1984 |

[54] SOLDER PASTE AND VEHICLE THEREFOR

[75] Inventor: Jennie S. Hwang, Pepper Pike, Ohio

[73] Assignee: SCM Corporation, New York, N.Y.

[21] Appl. No.: 546,795

[22] Filed: Oct. 31, 1983

[51] Int. Cl.$^3$ .............................................. B23K 35/34
[52] U.S. Cl. ....................................... 148/23; 148/24; 148/25; 148/26
[58] Field of Search ........................ 148/23, 24, 25, 26

[56] References Cited

U.S. PATENT DOCUMENTS

| 1,978,318 | 10/1934 | Miller | 148/26 |
| 2,493,372 | 1/1950 | Williams | 148/24 |
| 3,073,270 | 1/1963 | Johnson et al. | 148/24 |
| 3,925,112 | 12/1975 | Petersen, Sr. et al. | 148/25 |
| 3,954,494 | 5/1976 | Stayner et al. | 106/270 |
| 4,273,593 | 6/1981 | Mastrangelo | 148/24 |

*Primary Examiner*—Veronica O'Keefe
*Attorney, Agent, or Firm*—R. A. Sturges; M. H. Douthitt

[57] ABSTRACT

An essentially nonaqueous, water-rinsible, readily fusible vehicle for paste of powdered solder is comprised of a dispersion of flux consisting essentially of alkali metal hydroxide in liquid polyol and water soluble, normally solid synthetic wax.

10 Claims, No Drawings

SOLDER PASTE AND VEHICLE THEREFOR

This invention relates to a paste vehicle for powdered solder, and to a solder paste made with such vehicle, more particularly such paste containing tin alloy solder powder that is used for joining metals in structural applications such as in heat exchangers wherein like or dissimilar metal surfaces (e.g., copper-based metals or terneplated steel) are to be joined by soldering.

BACKGROUND OF THE INVENTION

The use of solder pastes, which are composed of powdered solder alloy dispersed in a relatively small volume of a vehicle, is experiencing wider acceptance in industry primarily because pastes are more readily adapted to automated manufacturing procedures than are the conventional manually effected solder bar, separate flux and iron or torch, or solder wire containing flux as in a core within the wire and an iron or torch. The make-up of prior solder paste compositions has been influenced largely by prior practices, particularly in respect of fluxing or surface preparing agents. These have comprised substantial portions of organic acids, inorganic acidic materials; e.g., zinc chloride, ammonium chloride, and the like, and rosin-based fluxes.

These compositions have not been entirely satisfactory in a number of ways. They have tended to be corrosive to the base metal. This problem was alleviated to a great extent with rosin-based flux vehicles. While rosin-based fluxes and vehicles can permit desirable hot slump of the solder deposit before fusion of the solder for structural soldering uses, frequently there is sputtering and "dewetting" (which leaves a residue as a halo around the solder joint).

It now has been found that an improved vehicle for solder paste is provided by an essentially nonaqueous medium comprising a water soluble, normally solid synthetic wax in which is dispersed a flux consisting essentially of selected alkali in liquid polyol. The synthetic wax melts below the temperature at which solder melts, and the vehicle (and its residues after soldering) are readily removable from metal surfaces by rinsing with water, hot or cold. The solder paste compounded with said vehicle is free from sputtering and spattering. The evolution of water vapor is practically nonexistent and nondisruptive from the inventive paste. Also particularly nonexistent in use of the paste is corrosivity, dewetting, and formation of water insoluble residue. The desirable properties for structural use of the solder paste such as significant hot slump and much spreading of solder desirably are evident.

BRIEF STATEMENT OF THE INVENTION

One aspect of the invention is a vehicle for powdered solder, said vehicle being essentially nonaqueous, removable from metal surfaces by water rinsing, liquifying (becoming fluent) at a temperature below that at which said solder melts, and comprising a dispersion of flux in water soluble, normally solid synthetic wax, said flux consisting essentially of alkali metal hydroxide in liquid polyol. Another aspect of the invention is a solder paste comprising 75-95 parts of tin-containing solder melting below 330° and having particle size not substantially coarser than about 100 mesh, and 5-25 parts of the foregoing paste vehicle.

To further extend utility of these compositions, there may be added one or more surfactants, water soluble amines and amine salts, one or more diluents, i.e., water soluble plasticizers such as a normally liquid ethylene oxide derivative and organic solvents that volatilize in the soldering operation. To form a solder paste the vehicles hereof are blended with a powdered solder alloy, often spherical particles or otherwise particles of diverse shapes and/or sizes, to the extent of about 75-93% metal by weight in the paste, desirably from 80-90% and preferably about 80-85% powdered metal. The particle size of the solder is desirably such that it will not settle readily out of the vehicle, which can be viscous (20,000-200,000 cps, Brookfield No. 7 Spindle at 20 rpm in room temperature) on standing. In general, the particle size is less than 100 mesh U.S. Standard Sieve Size, desirably —200 and +400 mesh.

DETAILED DESCRIPTION OF THE INVENTION

As indicated above, the vehicles are essentially nonaqueous; the resulting pastes therefore have no water in them other than very minute amounts possibly present as adventitious impurities that might be associated with good quality technical grade ingredients; no water is added deliberately as such or brought in in any appreciable quantity with any of the ingredients. Preferred compositions include additional fluxing agents, optionally a surfactant, and optionally a diluent, i.e., plasticizer and/or solvent. Each of these ingredients will be discussed.

The Essential Alkali Fluxing and Solderability Ingredients—Alkali Metal Hydroxide in Polyol The essential alkali here is an alkali metal hydroxide in a proportion of about 0.05-5% of the vehicle, and, advantageously 0.25-0.5%. It is brought into the vehicle dispersed in normally liquid polyol preferably as a clear solution therein but also possibly in an extremely finely subdivided, essentially colloidal condition imparting haze to the polyol. The alkali metal hydroxides useful here include these in descending order of preference: sodium hydroxide, potassium hydroxide, lithium hydroxide, and cesium hydroxide. Such alkali metal hydroxides have a limited solubility in polyhydric alcohols and conveniently are used in concentrations at or near the limit of solubility, that is less than about 10% by weight of the polyol. They even can be present as some alkali metal alcoholate in the polyol, the alcoholate being equivalent to the hydroxide. The polyhydric alcohols include: glycerine (which is preferred), ethylene glycol, diethylene glycol, and propylene glycol (in which such normally liquid polyhydric alcohol also can be dissolved some normally solid polyols such as pentaerythritol), the polyhydric alcohol containing from 2-6 hydroxyl groups and from 2-10 carbon atoms. A sodium hydroxide/glycerine solution is particularly effective and can be used as a sole fluxing agent, or it can be used in combination with a water soluble amino compound, and additional and/or auxiliary fluxing and solderability ingredients such as triethanolamine and its hydrochloride to provide effective fluxing for the instant paste.

Additional Fluxing and Solderability Ingredients—Amines and Related Materials Amines (and their salts which decompose during soldering to release vapors, e.g., amine hydrohalides and acetates) desirably can be used in conjunction with the alkali metal hydroxide polyol flux to supplement fluxing action. These materials should not leave residues on the soldered work which residues cannot be readily rinsed away with water. These amines have the formula:

wherein R, $R_1$, and $R_2$ independently selected from hydrogen, alkyl, alkylene, cycloalkyl, cycloalkylene, carboxyalkylene, aminoalkylene, hydroxyalkylene, carbonylalkyl radicals, etc., where no more than two of the R, $R_1$, and $R_2$ groups are hydrogen. The alkyl and cycloalkyl groups can contain from 1–6 carbon atoms; the amine component can contain 1–3 amino groups. A particularly useful group of amino compounds are those water soluble alkanolamines including: mono-, di-, and trimethanolamines; mono-, di-, and triethanolamines: mono-, di-, and tripropanolamines, and mixtures of mono-, di-, and trialkanolamines; alkyl and cycloalkyl amines, particularly the $C_2$-$C_6$ mono- and polyamines, e.g., triethylamine, tri-isopropylamine, diethylamine, mono-n-butylamine, propylene diamine, cyclohexylamine, cyclopropyl methylamine, cyclohexylamine, cyclohexyleneamine, diamino ethylamine, diaminopropylamine, and the like also are useful amines. The kind and configuration of the amino compounds useful herein are very broad. Amidino and guanidino fluxing agents, advantageously aliphatic ones, can be considered as useful amines for the instant purpose. Aromatic amines, while functional, often impart toxicity and therefore are not favored. Similarly, pyridine-type materials such as pyridine or a lutedine give off intensely objectionable odors and are not favored, but could be considered useful amines here.

Also useful to supplement the alkali metal-polyol flux are: amino acids which are water soluble, e.g., aminoacidic acid, beta-aminopropionic acid (beta-alanine), aminobutyric acid, epsilon-aminocaproic acid, N-methyl glycine, betaine, and the like, and water soluble amides of aliphatic carboxylic acids. Thus, amides such as urea and propionamide can be used as such supplements.

The Synthetic Wax Ingredient

The useful synthetic waxes are water soluble and normally solid at room temperature. They resemble a natural wax in appearance and texture. Typically they are alkylene oxide derivatives, most suitably ethylene oxide derivatives often nominated as polyethylene glycol waxes having an average molecular weight, in a range restricted to make them waxy, between about 3,000 and about 15,000. They generally form about 10–40% by weight of the vehicle. They are quite soluble in water, i.e., are capable of forming aqueous solutions that contain far more than a quarter by weight of such wax at room temperature. Preferred for the instant use for efficiency and economy are: Carbowax 8000, Carbowax being the trademark of Union Carbide Corporation for a series of polyethylene glycol waxes (polyoxyethylenic wax); and Polyglycol E 8000, a product of the Dow Chemical Company; the 8000 in each instance refers to the approximate average molecular weight of the particular grade of such wax. The Carbowax 8000 wax has molecular weight from 7,000–9,000, specific gravity of 1.207 at 25/25° C., Freezing Range of 60°–63° C., and it can form an approximately 50+% solution in water at 20° C. The Polyglycol E 8000 has specific gravity of 1.22 at 25/25° C., Pour Point of 140° F., and it forms a water solution containing more than 50% wax at 25° C.

Other Vehicle Ingredients

It has been found that a surfactant may be advantageously included in the vehicles hereof. Although such surfactant or wetting agent may be anionic, cationic, nonionic, or amphoteric, nonionic ones are preferred. Many surfactant materials are known. They are used in the present vehicles to help to control the rheological properties, shelf-life stability, air voids, etc. The amount used is determined by cut and try and is that amount which is sufficient to impart the desired control. These agents assist in the dispersion of the powdered metal and in carrying the fluxing agent to the surfaces being joined.

Specific surfactants include the alkylarylpolyether alcohols, ammonium perfluorinated carboxylates, fluorinated alkyl esters of fatty acids, acetylenic glycols (which as sometimes can act as a defoamer), polyoxyethylene sorbitan monostearate, etc. Surfactants commonly used in solder pastes may be used herein.

Diluents (solvents and/or plasticizers) are useful in the vehicle compositions hereof. For example, when a paste containing powdered solder metal is to be used in a screen printing process, diluents are conveniently used to adjust the viscosity to a satisfactory level. Ordinarily solvent materials are desirably volatile, at least at the melting point of the solder alloy, and are useful here in low proportion, typically less than 10% by weight of the vehicle. They can include: low molecular weight alcohols, e.g., ethyl, propyl, or isopropyl; ketones, e.g., methyl ethyl ketone, methyl isobutyl ketone; volatile hydrocarbons, e.g., hexane, cyclohexane, heptane, octane, low boiling naphthas, ethyl acetate, etc. The diluent ingredients should include from about 10 to 60% by weight of the vehicle, high boiling materials commonly regarded as plasticizers for this use such as a low molecular weight polyglycol, typically a diethylene glycol, diethylene glycol mono-n-hexyl (or butyl) ether; 2-butoxyethanol-1, and one or more normally liquid polyols such as the glygerine and/or glycol which is used to bring the necessary alkali metal hydroxide into the vehicle. The selection of many diluents can be influenced by end use, cost, environmental factors, desired plasticity, etc.

Minor amounts of known odorants, bactericides, fungicides, antifoam agents, etc., may also be included in the vehicles hereof if desired. Amounts of such ingredients usually range from about 0.1–1% by weight of the vehicle.

Preparation of the Vehicles

In the preparation of the vehicles hereof the wax is heated to melt it and to facilitate a mechanical blending operation. Warming of some of the other ingredients also can be of help often. It is not necessary that the mixture be a solution. The paste-like vehicle can be cloudy and contain two or more phases with the disperse phase fine enough so that it will not separate substantially on standing.

The Solder Powder

Solder compositions useful herein as the metal powder for blending with the above-described vehicles to form a paste, or for extrusion of a hollow wire for making a cored solder wire, are well known. In general, the solder powder compositions have a melting point in the range of from about 179° C. to about 330° C. and comprise tin together with lead and/or silver. Other metals such as zinc, aluminum, bismuth, nickel, and cadmium may also be used in the solder compositions.

For making a solder paste the metal powder is stably dispersed in the vehicle using conventional apparatus. Ordinarily it is of advantage to use high shear mixing for making the vehicle and initial paste making and low shear mixing for a final blending of the paste. The powder should pass through a 50 mesh screen (U.S. Sieve Series) (297 microns). Typically, the powder is finer than 100 mesh (149 microns) because larger particles are difficult to disperse and maintain in suspension in the paste. A particle size in the range of −200+400 mesh (U.S. Sieve Series) is preferred. For most purposes, from 3 to 20 parts by weight of solder metal powder is blended with 1 part by weight of vehicle. The paste compositions hereof generally will have a viscosity in the range of 50,000 cps to 200,000 cps. The preferred apparent viscosity will depend on the method of dispensing or application of the solder paste to the materials to be joined. Hand trowelling pastes are more satisfactory at the higher apparent viscosities than pastes intended for automatic dispensing such as extruding, flowing or spraying, or those which are most suited for application by a screen printing process. Viscosity can be controlled easily by the amount of solvent or solvent mixture and/or plasticizer employed in the vehicle, or by the vehicle to powder ratio.

In fabricating cored solder wire, conventional procedures are used substituting a vehicle of the present invention for a conventional core composition such as a rosin-based paste.

The following examples are intended to enable those skilled in the solder paste art to apply the principles of this invention in practical embodiments, but are not intended to limit the scope of the invention. In this specification all temperatures are in degrees Celsius, all parts, percentages, and ratios are by weight unless otherwise expressly stated, and sieve sizes are of the U.S. Standard Sieve Series.

EXAMPLES

An intimate blend of the following ingredients was used as the paste vehicle:

| Ingredient | Weight, % |
| --- | --- |
| Carbowax* 8000 Synthetic Wax | 30 |
| Diethylene Glycol Monobutyl Ether | 27 |
| Tetraethylene Glycol | 17 |
| Triethanolamine | 14.8 |
| Tetraethanolamine Hydrochloride | 6 |
| A solution of 7 parts Sodium Hydroxide in 93 parts of Glycerine | 4.6 |
| Fluorad** FD-430 Surfactant | 0.1 |
| Triton*** N-60 | 0.4 |
| Surfynol**** 104 Defoamer-Surfactant | 0.1 |

*The trademark of Union Carbide Company.
**The trademark of 3M Company.
***The trademark of Rhom & Haas Company.
****The trademark of Air Products and Chemicals Company.

The solder powders all were finer than 100 mesh. They were powder "A" (30% tin and 70% lead), powder "B" (10% tin and 90% lead), and powder "C" (96.5% tin and 3.5% silver). Powder "C" (containing the silver) was spherical in shape; the other two powders were made of irregular particles.

Pastes were compounded by: mixing in a high shear laboratory mixer the diethylene glycol monobutyl ether, tetraethylene glycol, about half the triethanolamine, and the Fluorad and Triton surfactants and warming to 49°; adding the molten wax (Carbowax at 66°), then blending in a grind of the tetraethanolamine hydrochloride ground with the remainder of the triethanolamine; at about 43°, blending in the solder powder; transferring the batch to a low shear, low speed Ross laboratory mixer at 41°, and completing the mixing and adding the Surfynol surfactant/defoamer when the batch cooled to 32°. The batch was finished by degassing at reduced pressure in a vacuum chamber. Pastes of A and B powders contained 80% by weight solder; pastes of a powder contained 85% by weight solder.

EXAMPLE 1

The solder pastes made with each of the three solder powders were tested for hot slump (collapse of the deposit before solder fusion) and for flow spreading of the molten solder away from the place of the paste application. At the end of the tests any residual vehicle and its residues therefrom generated by the heating operation were readily removable from the work by rinsing with lukewarm tap water. In such hot slump and flow tests a dot of paste about 5 mm. in diameter and 2–3 mm. thick was deposited upon a 2.54 cm. diameter round copper coupon by spatula, and the coupon was heated for a half minute to a minute to 330° in a Brown Instrument Company Reflow instrument, in effect an automated hot plate. All of these tests showed desirable hot slump and solder spread beyond the original dot area.

EXAMPLE 2

In soldering tests using all the solder pastes of Example 1 for joining metals, a joint was made between a horizontal circular metal coupon and a half coupon of the same diameter, the latter being bent at 90° at its middle so that the rounded part of the half coupon projected upwardly. The slender V-shaped base of the half coupon was joined to the top face of the horizontal coupon. The coupons were about 2.54 cm. in diameter and between 1 or 2 mm. thick. A dot of paste was deposited by spatula near one end of the intended interfacial area between the horizontal coupon and the base of the bent half coupon thereabove. The paste deposit was about 5 mm. in diameter by 2–3 mm. thick. Soldering for observation was done using the Reflow instrument.

In the soldering tests joints were made plain copper-to-plain copper, brass-to-brass, brass to a berylium-copper alloy, and terneplate to terneplate. The terneplate was a steel substrate having a thin coating of 88–93% lead/7–12% tin alloy. All of these joining tests gave sound structural joints with the solder deposit undergoing a desirable extensive hot slump, then fusing and flowing quite unrestrictedly to join at least about 90% of the interfacial joint area together; (it had a 90% "spread factor").

The useful vehicles can be formulated for various uses and various degrees of softness or stiffness to contain about 10–40% synthetic wax, about 4–60% liquid polyol such as polyglycol, or glycol ether or other high boiling diluent(s), including the necessary polyol coming in with the alkali metal hydroxide), 0–30% amino fluxing agents, about 0–10% additional supplemental and auxiliary fluxing and solderability agents, other than the alkali metal hydroxide, about 0.1–1% surfactants and defoamer, and about 2–25% of the solution (or an ultrafine dispersion) of the essential alkali metal hydroxide in polyol, said hydroxide amounting to about 0.05–5% of the vehicle.

What is claimed is:

1. A vehicle for powdered solder, said vehicle being essentially nonaqueous, removable from metal surfaces by water rinsing, fluent at a temperature below that at which said solder melts, and consisting essentially of a dispersion of flux in water soluble, normally solid synthetic wax, said flux consisting essentially of alkali metal hydroxide in liquid polyol.

2. The vehicle of claim 1 wherein said alkali metal hydroxide is sodium hydroxide in a proportion of about 0.05–5%.

3. The vehicle of claim 1 wherein said polyol is glycerine.

4. The vehicle of claim 1 wherein said wax is a waxy polyethylene glycol having molecular weight between about 3,000 and about 15,000, and it is in a proportion of about 10–40%.

5. The paste vehicle of claim 1 wherein said flux contains water soluble amine and/or amine salt.

6. The paste vehicle of claim 6 wherein said amine comprises an alkanolamine.

7. The paste vehicle of claim 1 wherein said flux contains surfactant.

8. The paste vehicle of claim 1 wherein said flux contains diluent.

9. A solder paste consisting essentially of: 75–95 parts of tin-containing solder melting below 330° and having particle size not substantially coarser than about 100 mesh; and 5–25 parts of the paste vehicle of claim 1.

10. The solder paste of claim 9 wherein said flux contains sodium hydroxide, an alkanolamine and/or a salt thereof, surfactant, and diluent.

* * * * *